Sept. 5, 1939.  G. A. TINNERMAN  2,172,302
FASTENING DEVICE
Filed Aug. 6, 1938

INVENTOR.
George A. Tinnerman
BY Bates, Gohick, & Teare
ATTORNEYS

Patented Sept. 5, 1939

2,172,302

UNITED STATES PATENT OFFICE 2,172,302

FASTENING DEVICE

George A. Tinnerman, Rocky River, Ohio, assignor to Albert H. Tinnerman, Cleveland, Ohio Application August 6, 1938, Serial No. 223,445

8 Claims. (Cl. 24—237)

This invention relates to sheet metal fasteners and has particular reference to a clip which may be used for holding one article in a predetermined position with reference to another article. In the embodiment illustrated, the fastener is used for positioning a helical spring with reference to an angle plate although it may be used for holding other articles if desired.

One arrangement heretofore used for positioning an article with reference to an apertured member has been to utilize a fastening arrangement such as a bolt and nut, together with a clip which would engage one of the articles and be held firmly in place on the other article by the bolt. This construction has required a multiplicity of parts and has necessitated considerable time for completing an assembly. Moreover, the tendency of the bolt and nut to loosen, particularly where the nut is subjected to vibration, lessens the effectiveness of the connection, and thereby detracts from its value as an effective and desirable arrangement.

An object of my invention is to make a fastening device in the form of a spring clip which may be sprung into place on one of the parts by engagement with an aperture therein, and which may hold the other part in predetermined position with respect to the first part merely by the act of positioning the fastener on one of the parts.

Figure 1:
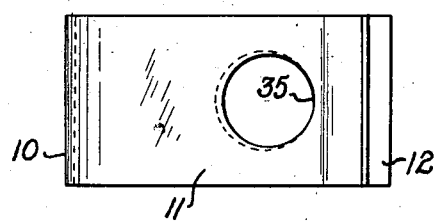
Figure 2:
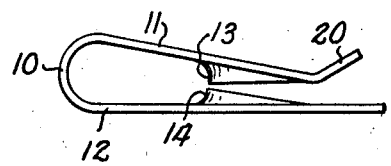
Figure 3:
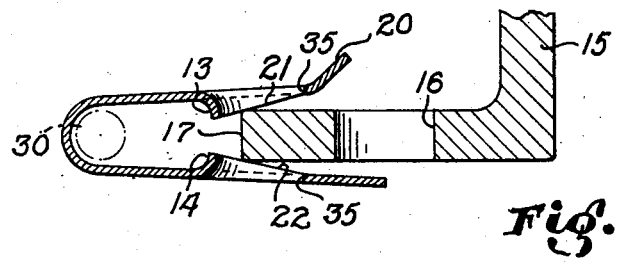
Figure 4:
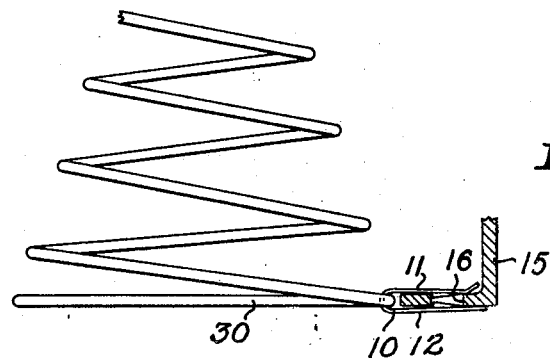

Referring now to the drawing, Fig. 1 is a top plan view of a fastener embodying my invention; Fig. 2 is a side view of the fastener; Fig. 3 is a vertical section taken through the fastener during the assembling operation, and Fig. 4 is a sectional view of one of the parts to which the fastener is attached, the other part being shown in elevation.

The fastener illustrated comprises a one-piece sheet metal strip that is bent intermediately at 10 to provide an arm 11 and a lower arm 12, each of which has a projection offset therefrom, as at 13 and 14 respectively. The projections are on the inner sides of the arms and are substantially in registration for engagement with the walls of the aperture in the part upon which the fastener is to be positioned. For example the part 15 has an opening 16 preferably extending therethrough near the marginal edge 17 thereof. The fastener being substantially U-shaped can be pressed onto the part 15 until the projections enter the opening.

To facilitate the attachment of the fastener, one of the arms preferably the upper one, has the end portion flared outwardly as at 20. Moreover, the projections preferably include tapered surfaces 21, and 22, that act as cams and facilitate the introduction of the part between the arms of the fastener. The fastener being made of spring steel and possessing the formation shown in Fig. 2 requires separation of the arms to admit an attaching part. The inherent resiliency of the metal of which the fastener is made therefore causes it to tend to assume its normal shape and thereby to grip the part solely by spring tension. Thus a workman, by a single operation, can snap the fastener into place and thereby hold two parts in assembled relationship. It is to be understood that the fastener, before being applied to the apertured part, envelops the second part which in the drawing is illustrated as the bottom of a spring 30. The projections illustrated at 13 and 14 are shown as being formed from that portion of each arm which surrounds an opening 35 therein, and in the preferred arrangement the edges are tapered to facilitate the positioning of the fastener upon an article. It is to be understood however that other forms of projections may be used, if desired, to accomplish the intended purpose.

I claim:

1. A clip comprising a strip of sheet metal having a bend providing a pair of arms extending in the same general direction and adapted to receive an apertured part therebetween, one of said arms being provided with a projection on the inner face thereof for engaging in the aperture in said part to retain the clip in applied position thereon, said projection having a tapered cam surface facilitating application of the clip to such applied position.

2. A clip comprising a strip of sheet metal having a bend providing a pair of arms extending in the same general direction and adapted to receive an apertured part therebetween, one of said arms being provided with an opening having a bent marginal edge portion providing a projection on the inner face of the arm for engaging in the aperture in said part to retain the clip in applied position thereon, said projection having a tapered cam surface facilitating application of the clip to such applied position.

3. A clip comprising a strip of sheet metal having a bend providing a pair of arms extending in face to face relation in the same general direction and adapted to receive an apertured part therebetween, said arms being provided with projections on their inner faces for engaging in the aperture in said part from opposite sides thereof to retain the clip in applied position, said projections having tapered cam surfaces facilitating application of the clip to such applied position.

4. A clip comprising a strip of sheet metal having a bend providing a pair of arms extending in face to face relation in the same general direction and adapted to receive an apertured part therebetween, said arms being provided with openings in substantial registration, each of said openings having a bent marginal edge portion providing substantially opposed projections on the inner faces of the arms for engaging in the aperture in said part from opposite sides thereof to retain the clip in applied position thereon, said projections having tapered cam surfaces facilitating application of the clip to such applied position.

5. A clip to be applied to an edge of a supporting part having an opening spaced from such edge, said clip comprising a strip of sheet metal having a bend providing a pair of arms extending in the same general direction and adapted to grip said part therebetween, one of said arms having a projection on the inner face thereof for engaging in said opening in the supporting part in the applied position of the clip, said projection having a tapered cam surface facilitating application of the clip to such applied position by causing a gradual spreading of the arms thereof over the edge of the supporting part.

6. A clip to be applied to an edge of a supporting part having an opening spaced from such edge, said clip comprising a strip of sheet metal having a bend providing a pair of arms extending in the same general direction and adapted to receive said part therebetween, one of said arms being provided with an opening having a bent marginal edge portion providing a projection on the inner face of the arm for engaging in said opening in the supporting part in the applied position of the clip, said projection having a tapered cam surface facilitating application of the clip to such applied position by causing a gradual spreading of the arms thereof over the edge of the supporting part.

7. A clip to be applied to an edge of a supporting part having an opening spaced from such edge, said clip comprising a strip of sheet metal having a bend providing a pair of arms extending in the same general direction toward their free ends and adapted to grip said part therebetween, said arms being provided with openings in substantial registration, each of said openings having a bent marginal edge portion providing projections on the inner faces of the arms for engaging in said opening in the supporting part from opposite sides thereof in the applied position of the clip thereon, said projections having tapered cam surfaces diverging toward the free ends of the arms, said cam surfaces facilitating application of the clip to applied position by causing a gradual spreading of the arms over the edge of said part.

8. A clip to be applied to an edge of a supporting part having an opening spaced from such edge, said clip comprising a strip of sheet metal having a bend providing a pair of arms extending in the same general direction toward their free ends and adapted to grip said part therebetween, said arms being provided with openings in substantial registration, each of said openings having a bent marginal edge portion providing substantially opposed projections on the inner faces of the arms for engaging in said opening in the supporting part from opposite sides thereof in the applied position of the clip thereon, said projections having tapered cam surfaces diverging toward the free ends of the arms, one of said arms having a flared free end portion to facilitate initial application of the clip to the edge of said part, and said diverging cam surfaces of the projections facilitating the final application of the clip to applied position by causing a gradual spreading of said arms over the edge of said part.

GEORGE A. TINNERMAN.